(12) United States Patent
Tiana et al.

(10) Patent No.: US 9,000,350 B1
(45) Date of Patent: Apr. 7, 2015

(54) TIME-DOMAIN OVERLAP IMAGERY DETECTING SYSTEM AND METHOD OF USING SAME

(75) Inventors: Carlo L. Tiana, Portland, OR (US); Nathaniel S. Kowash, Portland, OR (US); Robert B. Wood, Beaverton, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 255 days.

(21) Appl. No.: 13/610,697

(22) Filed: Sep. 11, 2012

(51) Int. Cl.
*H01L 31/00* (2006.01)
*H04N 1/00* (2006.01)

(52) U.S. Cl.
CPC ................... *H04N 1/00127* (2013.01)

(58) Field of Classification Search
CPC ............ B64D 45/08; H01J 40/14; G01J 1/44; G01V 8/20; G01S 17/026; G01S 17/08; G01S 17/32; G01S 17/46; G01C 3/08; G01C 21/04
USPC ........ 250/214.1, 221, 214 R; 73/1.45, 178 T, 73/490, 514.26; 356/3.06–3.08, 4.01, 356/5.01–5.08, 73, 213, 215, 222; 340/555–557, 947, 951, 953, 972
See application file for complete search history.

(56) References Cited

U.S. PATENT DOCUMENTS

| | | | |
|---|---|---|---|
| 6,119,055 A * | 9/2000 | Richman | 701/16 |
| 6,373,557 B1 * | 4/2002 | Mengel et al. | 356/4.07 |
| 7,705,879 B2 | 4/2010 | Kerr et al. | |

* cited by examiner

*Primary Examiner* — Georgia Y Epps
*Assistant Examiner* — Carolynn A Moore
(74) *Attorney, Agent, or Firm* — Angel N. Gerdzhikov; Donna P. Suchy; Daniel M. Barbieri

(57) ABSTRACT

Provided in one embodiment is a method of detecting a pulsing signal, comprising: detecting the pulsing signal using a first sensor device acquiring data at a first time interval; and detecting the pulsing signal using a second sensor device acquiring data at a second time interval; wherein the second time interval overlaps a portion of the first time interval.

20 Claims, 4 Drawing Sheets

(a)

TIME-DOMAIN OVERLAP IMAGERY DETECTING SYSTEM AND METHOD OF USING SAME

BACKGROUND

Strobed approach lighting systems (sometimes known as the "rabbit") are important features of the airfield environment, particularly in low visibility, as they extend many hundreds of feet into the approach path beyond the runway threshold. They are also the brightest elements of the approach lighting systems often found in an airport. The strobed approach lighting system gives signals to the pilots to permit (or bar) approach to the airport, particularly in low visibility conditions.

Pre-existing enhanced vision systems ("EVS") and enhanced vision flight system ("EFVS") systems cannot reliably detect the strobed portion of the approach lighting systems (the "rabbit") as these systems are "blind" at regular time intervals due to internal electronic constraints—detector readout, limited integration time to prevent saturation, etc. For example, in high-brightness environments (e.g. sunlit fog) a sensor might only stare at the real world scene for 1 ms out of the perhaps 16 ms typical frame update time, in order to prevent saturation. The inability of pre-existing systems to detect strobes reliably has been cited by the Federal Aviation Administration ("FAA") as a major drawback of current systems. Even when integration times are longer, a portion of the frame time is devoted to detector readout, and during this dead time the system is blind to the external scene and "misses" a subset of the strobe pulses. In addition, this temporal undersampling of the pulsed system causes misleading and erroneous rendering of the lights, sometimes making them appear as traveling in the wrong direction.

SUMMARY

In view of the foregoing, the Inventors have recognized and appreciated the advantages of a system that is a cross-sensor time-domain imagery overlap system and methods of using same for reliable detection of strobed sources according to one exemplary embodiment. Such system and methods may be useful in aviation, such as in an aircraft according to one embodiment.

Accordingly, provided in one embodiment is a method of detecting a pulsing signal, comprising: detecting the pulsing signal using a first sensor device acquiring data at a first time interval; and detecting the pulsing signal using a second sensor device acquiring data at a second time interval; wherein the second time interval overlaps a portion of the first time interval.

Provided in another embodiment is a method of detecting a pulsing signal, comprising: detecting the pulsing signal using a plurality of sensor devices acquiring data at respectively different time intervals, wherein at least some of the time intervals overlap one another; and wherein the pulsing signal comprises strobed light.

Provided in another embodiment is a non-transitory computer readable medium having instructions stored therein, the instructions being executable by at least one processor of a system to execute a method of detecting a pulsing signal, the method comprising: detecting the pulsing signal using a first sensor device acquiring data at a first time interval; detecting the pulsing signal using a second sensor device acquiring data at a second time interval; and processing a result of the detections of the pulsed signal from the first sensor device and the second sensor device; wherein the second time interval overlaps a portion of the first time interval.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Following are more detailed descriptions of various concepts related to, and embodiments of, inventive systems and methods of detecting pulsing signal. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Provided in one embodiment herein is a low-cost system that may overcome the challenges faced by the pre-existing sensors. The system, and methods of using same, may include multiple sensor devices used sequentially, or alternatively, to detect a pulsing signal. The use of multiple sensor devices may, for example, fill the dead time of any one sensor alone by staggering the temporal coverage of the scene between the sensors.

Figure 1:
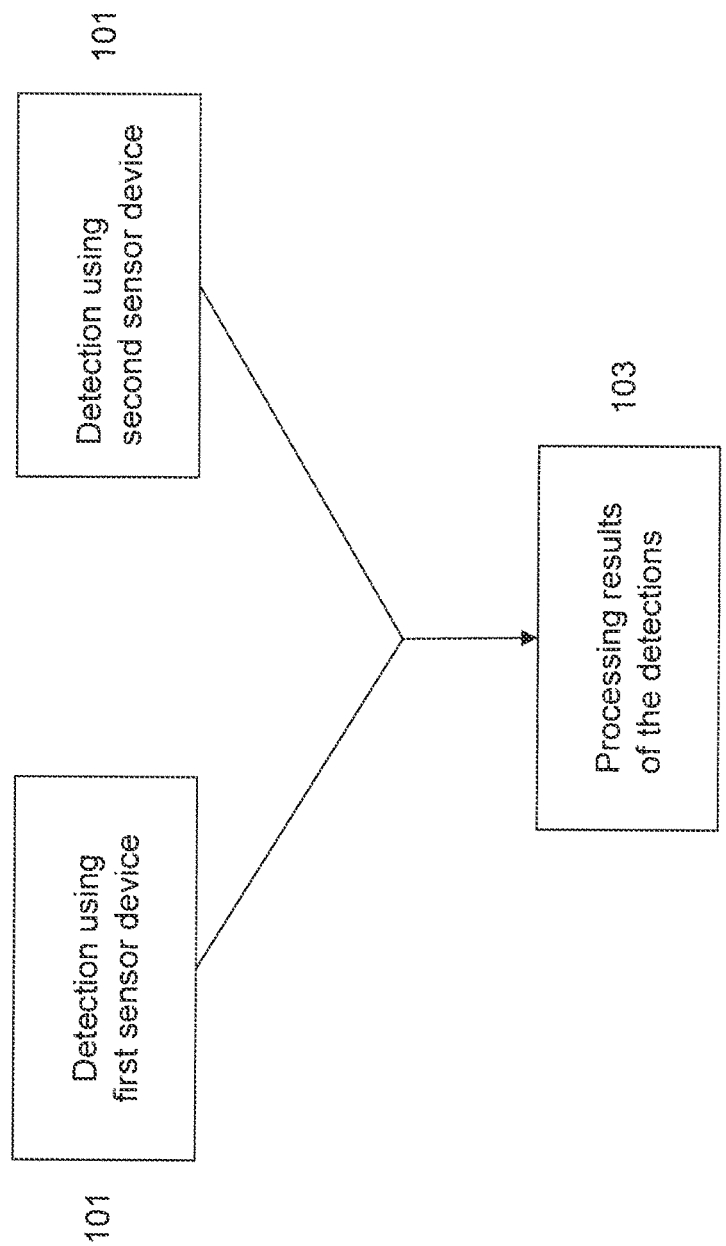
FIG. 1 provides a schematic flow chart illustrating the process provided in one embodiment.

FIG. 1 provides a schematic flowchart illustrating a method of detection provided in one embodiment. In this embodiment of detecting a pulsing signal, a first sensor is used to detect the pulsing signal 101, the first sensor acquiring data at a first time interval and a second sensor is used to detect the pulsing signal 101, the second sensor acquiring data at a second time interval. The first second and second sensors may acquire data at different time sequences, as described below. The first and second time intervals may overlap. The result of the detections are then processed 103, such as to extract useful information.

Figure 2:
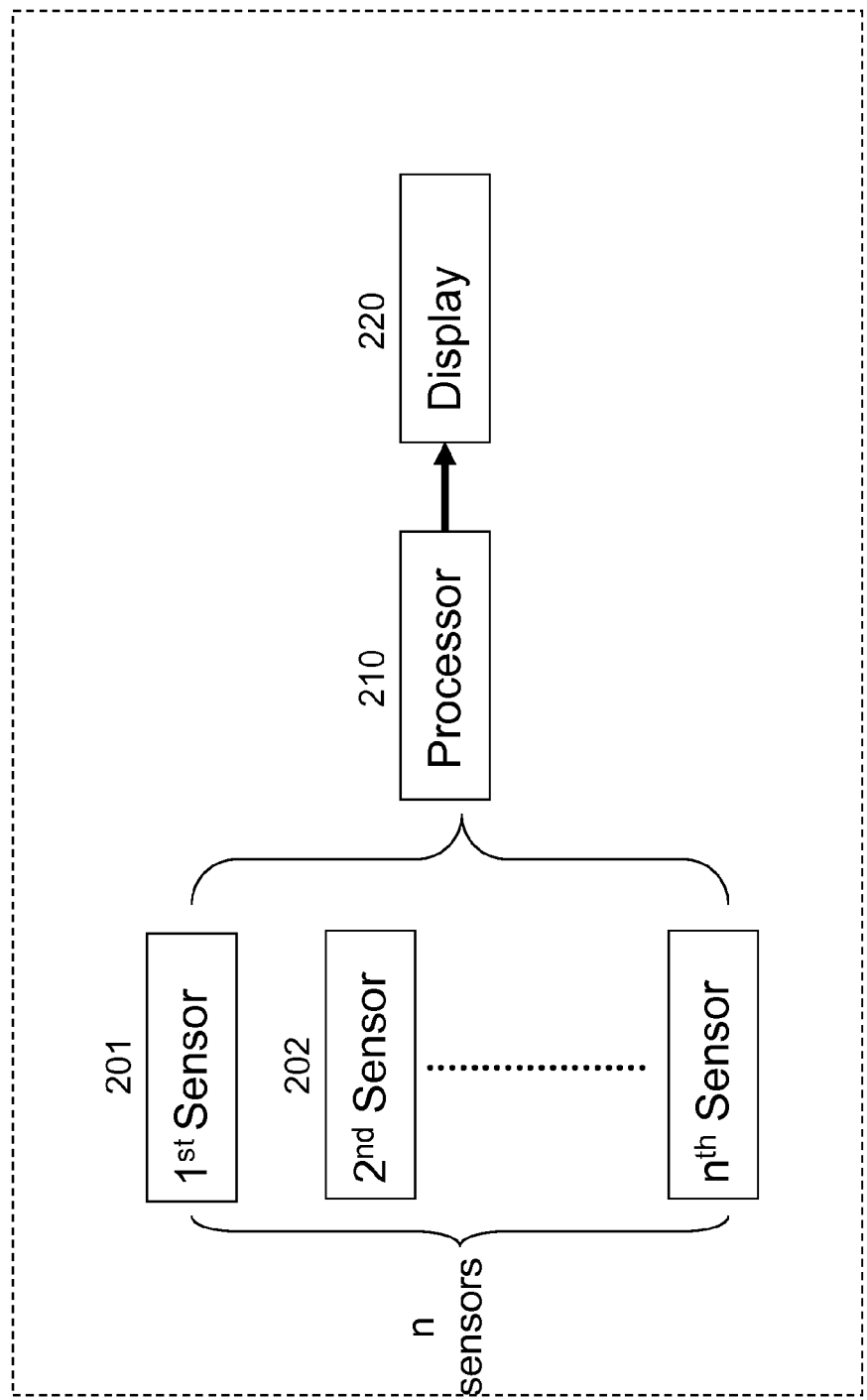
FIG. 2 provides a schematic block diagram illustrating the different components of a system in an aircraft in one embodiment.

FIG. 2 provides a schematic block diagram of a system that may be present in an aircraft in one embodiment. The system may comprise a plurality (number n) sensor devices—e.g., first sensor device 201, second sensor device 202, . . . , n$^{th}$ sensor device. The sensor devices may be used together to acquire data related to the pulsing signals, and the data may be transmitted a processor 210. As described below, the processor 210 may be employed to process, including analyze, the data. The result of the process or analysis may be transmitted to a display 220. The transmission may involve wireless transmission or wired transmission, or both. The display may be located in the cockpit and be employed to output the results of the detection. Additional components, such as those commonly found in an aircraft cockpit, may be employed as well. A reader, such as a pilot, may be able to utilize the output data, for example, to determine the location of the source of the pulsing signal (and thus, for example, location of the runway, or any part of an airport) and/or distance between the aircraft and the signal. The airport may refer to any airport used for any flying instrument. For example, the airport may be for aircraft, helicopter, jet, etc for commercial, military, and the like, purpose. In one embodiment, the strobed light may be that found in an airport for commercial or military aircraft.

Other applications not necessarily related to flying is also suitable. For example, the strobed light may be a pick up marine strobed light. In general, the methods and devices described herein may be applicable to any signal that is pulsing.

The terms "first," "second," etc., herein are merely employed to denote distinct entities and are not meant to limit the descriptions of the entities in anyway unless specifically stated so.

The pulsing signal may refer to any type of signal that has a pulsing frequency. In one embodiment, the pulsing signal is an electromagnetic signal such as visible light. For example, the pulsing signal may comprise strobed light. In one embodiment, the strobed light may be a part of a strobed approach light system.

The sensor devices herein may refer to any suitable sensor that is capable of detecting a signal, for example, a pulsing signal. The sensor device, including the cameras, and the use thereof may be any of those described in, for example, U.S. Pat. No. 7,705,879, although, as described further below, the teachings of the '879 patent is very distinct from the systems and methods described herein. The sensor devices may comprise a camera, a visible band sensor, a short-wave infrared sensitive sensor, or combinations thereof. The cameras may be visible light sensitive image cameras, such as charge-coupled device (CCD) or complementary metal-oxide-semiconductor (CMOS) sensor cameras, conventional television cameras, etc. The cameras may be sensitive to short-wave infrared light.

The detection methods described herein may use any number of sensors, ranging from 1 to 2, 3, 4, 5, 7, 8, 9, 10, 12, 14, 16, 18, 20, or more. The number of the sensors is not limited and may be adjusted based on the application. The multiple sensor devices need not be separate entities. For example, in one embodiment, the first, second, third, etc., sensor devices described herein are all a part of one larger single sensor system. For example, the different sensors may be different portions of a single sensor system.

The plurality of sensors may be placed in any configuration relative to one another. In one embodiment, the sensors are placed so that the data acquisition of the individual sensor is not impeded or hindered by the placement of the sensor with respect to the other sensors in the plurality.

Each sensor may have a set of acquisition parameters. The parameters may include acquisition frequency, processing time, etc. The data acquisition frequency of a sensor device may be described in terms of an acquisition time interval, as frequency is an inverse of time. For example, an acquisition frequency of 0.5 Hz is equivalent to sampling (or detecting) every 2 seconds. The (data) acquisition time interval of the sensors described herein is not limited to any particular value and may be any value depending on the sensor device employed. The time interval may range from nanoseconds to microseconds to seconds, or even longer. The acquisition time interval of the sensor may be longer or shorter than that pulsing time of the pulsing signal, depending on the application.

In one embodiment, the sensor device may have an acquisition time interval of between about 2 ms and about 100 ms—e.g., between about 3 ms and about 80 ms, between about 4 ms and about 60 ms, between about 5 ms and about 40, between about 6 ms and about 30 ms, between about 7 ms and about 20 ms, between about 8 ms and about 15 ms, between about 9 ms and about 12 ms. A different value or range may also be suitable, depending on the application. In one embodiment, the sensor device may have an acquisition time interval of about 5, 6, 7, 8, 9, 10, 11, 12, 13, 14, 15, 16, 17, 18, 19, 20 ms, or more.

When multiple sensor devices are involved, the multiple sensor devices may have the same acquisition parameters or different acquisition parameters. In one embodiment, the multiple sensor devices are the same type of sensor devices. In another embodiment, the multiple sensor devices are different types of sensor devices. In some embodiments, the sensor devices are the same type of equipment but are set to have different acquisition parameters. Alternatively, in some embodiments, the sensor devices are different types of equipment but are set to have the same acquisition parameters. For example, at least some (such as all) of the multiple sensor devices may have the same acquisition time intervals or they may have different acquisition time intervals. In the case where more than two sensor devices are employed, some, or all of the sensor devices may have the same acquisition parameters.

The use of multiple sensor devices may allow overlapping of the acquisition time intervals of at least some of these sensor devices. For example, after the first sensor device begins to acquire data for a certain predefined period of (lag) time, a second sensor device may begin to acquire data. The temporal delay may cause overlap of the acquisition. The second sensor device may have the same or different acquisition time interval. The extent of the overlap may be of any value, depending on the type of device used, acquisition pattern of each device, etc.

Figure 3:
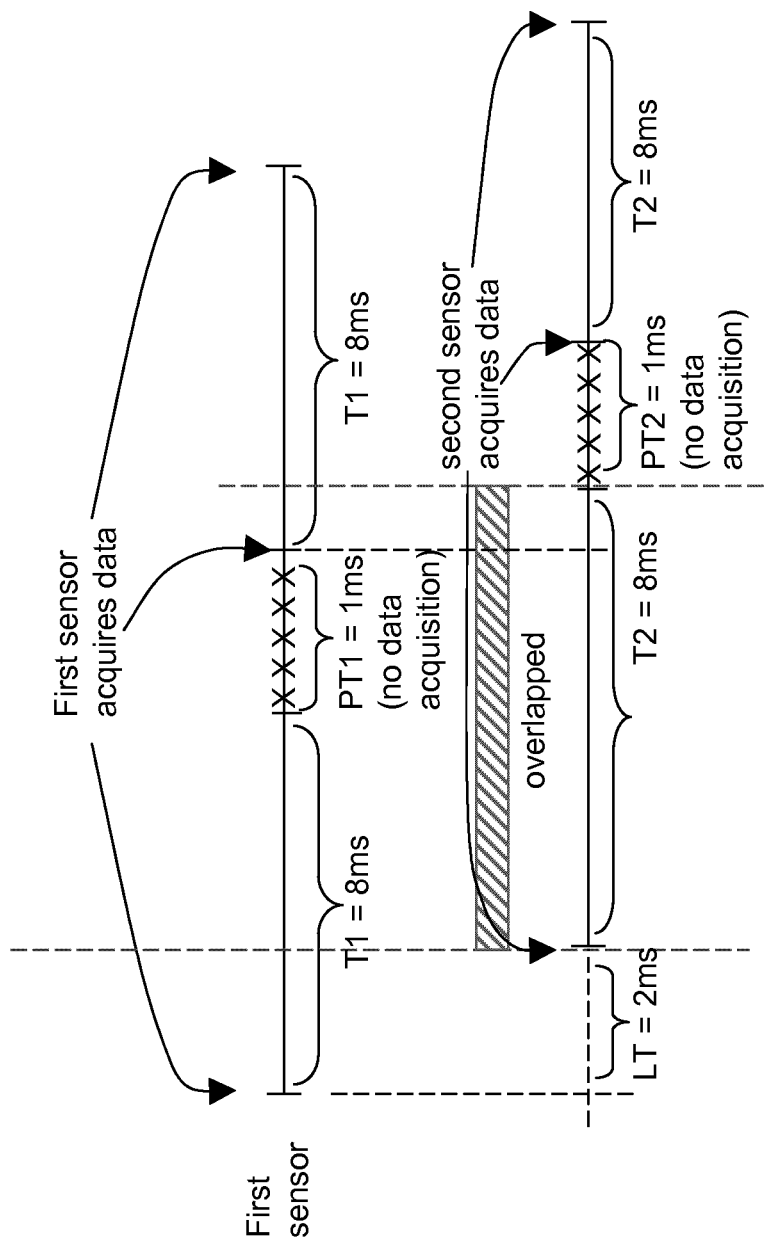
FIGS. 3(a)-3(b) provides schematics of two timing diagram, illustrating the different detection time intervals of the different sensor devices, in two illustrative embodiments.
Figure 3:
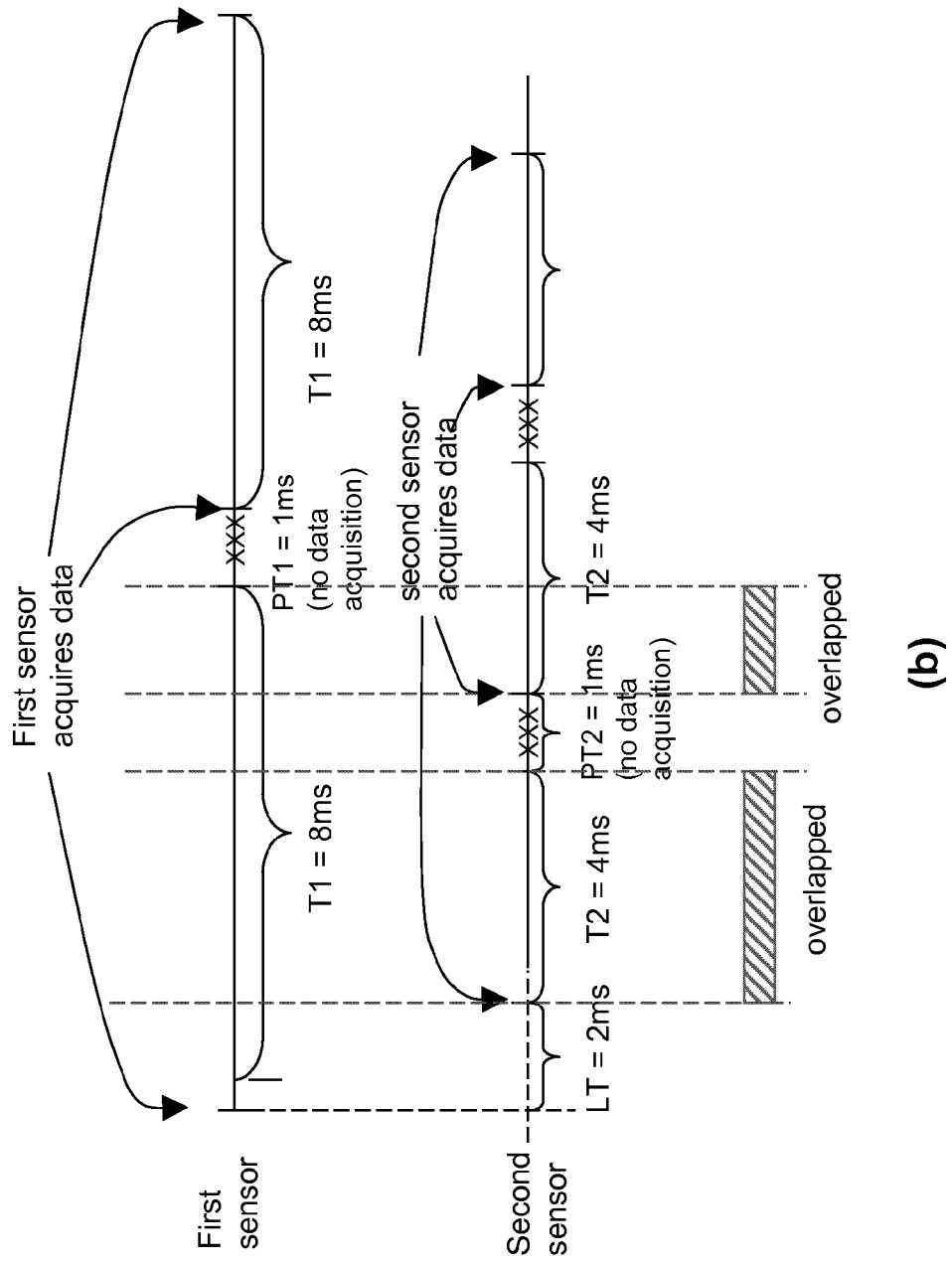

FIGS. 3(a)-3(b) illustrate two examples of the acquisition patterns described herein. In the example shown in FIG. 3(a), a first sensor device and the second sensor device may have both an acquisition time interval T1 and T2 of 8 ms (i.e., every 8 ms each of the first and second sensor devices will acquire a data point, e.g., by imaging, detecting, etc.) and a processing time (for processing the acquired data) PT1 and PT2 of 1 ms. If the lag time LT is 2 ms (i.e., the second sensor device begins to acquire data 2 ms after the first sensor has begun), then the overlap time interval OT is 6 ms. As shown in FIG. 3(a), during this overlap time, the first sensor device undergoes a processing time P1, during which the first sensor device is not acquiring new data and is only processing the data acquired during the previous 8 ms T1. In this configuration, however, while the first sensor device is in processing time P1, the second sensor device continues to acquire data. As a result, the two sensor devices work in concert to avoid any "downtime" where the data are not acquired by either of the sensors.

On the other hand, FIG. 3(b) provides an example wherein the two sensor devices have two different data acquisition time intervals. For example, T1 is 8 ms, while T2 is 4 ms, while PT1 and PT2 both are 1 ms and the lag time LT is 2 ms. As shown in FIG. 3(b), the overlapped time intervals are different from that described in FIG. 3(a). However, during the data processing time of the second sensor PT2, the first sensor device continues to acquire data, similarly for the second sensor while the first sensor is at PT2. As a result, the two sensor devices work in concert to avoid any "downtime" where the data are not acquired by either of the sensors. The numbers provided herein are merely arbitrarily chosen and may be of any value. Also, more than two sensor devices may be used. In one embodiment, several sensor devices may be used, as long as at all times at least one of the sensor devices is acquiring data.

In one embodiment, the method may further comprise processing the result of the data acquisition obtained from any or all of the sensor devices involved. In one embodiment, the data acquired may constitute a per-frame set of points (pixels), each of which represents the pulsing signal. The processing may involve, for example, analyzing the pulsing signal with respect to timing, pattern, or combinations thereof. The processing may be conducted by a processor, such as a computer.

In one embodiment, the result of the detection, including for example image data of the pulsing signal, may be fed into a circuitry that integrates their output and re-sequences the images into a stream of the desired frame rate. The detection may be carried out digitally. In one embodiment, the detection may further include additional processing steps, such as thresholding, as High Dynamic Range (HDR) processing, noise reduction enhancements, or a combination thereof. In one embodiment, external trigger signals may be provided by the system to the sensor devices to help ensure synchronized and overlapping operation.

The processing may allow determination of certain information that may be useful to the observer. For example, based on the detection result of any or all of the sensor device(s) involved, a geographic coordinate of the source of the pulsing signal may be determined based on the detecting sensor device(s). Based on the information, further information, such as a relative distance between a source of the pulsing signal and the sensors may be deduced. In one example wherein the methods described herein are implemented in an aircraft, the relative distance calculated may be helpful to the pilot to determine the location of a particular destination.

In one embodiment, the data acquisition (or detection) of any of the sensor devices employed may be synchronized with the pulsing frequency of the pulsing signal to better enhance the reliability of the system. The sensor devices may have a separate synchronization method (e.g., using an external device) that allows re-sequencing of the "active" data acquisition time. Once the pattern and timing of the target pulsing signal is detected, the sensor device(s) may be externally synchronized to that particular pattern and timing, and thus optimally staggered to capture and/or detect the pulsing signal.

The sensor device systems and the methods described herein may have additional capabilities. In one embodiment wherein the pulsing light is pulsed at a very high rate such that the pulsing time interval is shorter than the data acquisition framing time interval of a sensor, the systems and methods described herein allow detection of the pulsing signal without the need of any external clock signals. For example, the methods of U.S. Pat. No. 7,705,879, which describes a system that needs accurate external clock signals (e.g. from GPS satellites) in order for the encoded information to be detected and decoded. By contrast, the methods and systems described herein would not need to have such clocks because the sensor devices can be staggered in their acquisition using external triggers as described above. Further, the subsequent image post-processing may recover the high-frequency information that would not otherwise have been resolved by any one sensor alone. In on embodiment, the encoding frequency could be inferred by rapidly changing the initial trigger time. Alternatively, with knowledge of that frequency (as might be, for example, published in airport information plates), the sensor device(s) described herein may be automatically staggered by a (lag) time interval equal to a multiple or sub-multiple of the pulse length to provide sufficient overlap. In one embodiment, the images from each sensor subsequently may be subtracted or otherwise processed to extract the pulse information even though the sensor active time does not temporally resolve the pulse itself.

The methods described herein may be automated. For example, some or all parts of the methods described herein may be stored as instructions on a non-transitory computer readable medium. The instructions may be executed by at least one processor (e.g., processor in a computer) contained in a system. The system, as aforedescribed, may be a part of the aviation equipment aboard an aircraft. A machine-readable medium can be any available medium that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired and wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters including timing parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments of the invention can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single computer or distributed among multiple computers.

In this respect, various aspects of the invention may be embodied at least in part as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium or non-transitory medium) encoded with one or more programs that, when executed on one or more computers or other processors, perform methods that implement the various embodiments of the technology discussed above. The computer readable medium or media can be transportable, such that the program or programs stored thereon can be loaded onto one or more different computers or other processors to implement various aspects of the present technology as discussed above.

The terms "program" or "software" are used herein in a generic sense to refer to any type of computer code or set of computer-executable instructions that can be employed to program a computer or other processor to implement various aspects of the present technology as discussed above. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." Any ranges cited herein are inclusive.

The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed:

1. A method of detecting a pulsing signal, comprising:
    detecting the pulsing signal using a first sensor device acquiring data at a first time interval; and
    detecting the pulsing signal using a second sensor device acquiring data at a second time interval;
    wherein the second time interval and the first time interval only partially overlap each other,
    wherein the pulsing signal is continuously detected by the combination of the first and second sensor devices.

2. The method of claim 1, wherein the pulsing signal comprises strobed light of a strobed approach light system.

3. The method of claim 1, wherein at least one of the first sensor device and the second sensor device comprises a camera, a visible band sensor, a short-wave infrared sensitive sensor, or combinations thereof.

4. The method of claim 1, wherein the first sensor device and the second sensor device are parts of a sensor system.

5. The method of claim 1, wherein at least one of the first and second time intervals has a length of between about 8 ms and about 15 ms.

6. The method of claim 1, wherein the first time interval and the second time interval have different lengths.

7. The method of claim 1, the first time interval second time interval have the same length.

8. The method of claim 1, further comprising synchronizing with a pulse of the pulsing signal at least one of the (i) detecting using the first sensor device and (ii) detecting using the second sensor device.

9. The method of claim 1, further comprising detecting the pulsing signal using a third sensor device acquiring data at a third time interval.

10. The method of claim 1, further comprising determining a relative distance between a source of the pulsing signal and at least one of the first sensor device and the second sensor device based on a result of the detections.

11. A method of detecting a pulsing signal, comprising:
    detecting the pulsing signal using a plurality of sensor devices acquiring data at respectively different time intervals,
    wherein at least some of the time intervals overlap one another such that the overlapping time intervals only partially overlap each other; and
    wherein the pulsing signal comprises strobed light, and is continuously detected by the combination of the plurality of sensor devices.

12. The method of claim 11, wherein at least some of the different time intervals begin at different times.

13. The method of claim 11, wherein at least one of the time intervals has a length of between about 8 ms and about 15 ms.

14. The method of claim 11, further comprising analyzing the pulsing signal at least with respect to timing, pattern, or a combination thereof.

15. The method of claim 11, further comprising processing a result of the detections from the first sensor device and the second sensor device.

16. A non-transitory computer readable medium having instructions stored therein, the instructions being executable by at least one processor of a system to execute a method of detecting a pulsing signal, the method comprising:
    detecting the pulsing signal using a first sensor device acquiring data at a first time interval;
    detecting the pulsing signal using a second sensor device acquiring data at a second time interval; and
    processing a result of the detections of the pulsing signal from the first sensor device and the second sensor device;
    wherein the second time interval and the first time interval only partially overlap each other,
    wherein the pulsing signal is continuously detected by the combination of the first and second sensor devices.

17. The non-transitory computer readable medium of claim 16, wherein the method further comprises determining a coordinate of at least one of the first sensor device and the second sensor device relative to a source of the pulsing signal based on the result.

18. The non-transitory computer readable medium of claim 16, wherein the method further comprises high dynamic range processing, noise reduction enhancing, or a combination thereof.

19. The non-transitory computer readable medium of claim 16, wherein the system is a part of an aircraft.

20. The non-transitory computer readable medium of claim 16, wherein at least one of the first sensor device and the second sensor device comprises a camera, a visible band sensor, a short-wave infrared sensitive sensor, or combinations thereof.

* * * * *